(12) United States Patent
Kaushal et al.

(10) Patent No.: US 8,819,759 B2
(45) Date of Patent: Aug. 26, 2014

(54) DETERMINING THE LOCATION OF A POINT OF INTEREST IN A MEDIA STREAM THAT INCLUDES CAPTION DATA

(75) Inventors: Arpan Kumar Kaushal, Bangalore (IN); Muralidharan Narayanan, Bangalore (IN); Aravind Soundararajan, Bangalore (IN); Matthew F. Storch, Redwood City, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 232 days.

(21) Appl. No.: 13/534,145

(22) Filed: Jun. 27, 2012

(65) Prior Publication Data

US 2014/0002736 A1 Jan. 2, 2014

(51) Int. Cl.
*H04N 7/16* (2011.01)
(52) U.S. Cl.
USPC ............. 725/136; 725/20; 725/131; 725/151; 725/139
(58) Field of Classification Search
None
See application file for complete search history.

(56) References Cited

U.S. PATENT DOCUMENTS

| 6,637,032 B1* | 10/2003 | Feinleib ........................ 725/110 |
| 7,519,273 B2* | 4/2009 | Lowthert et al. .............. 386/248 |
| 7,661,121 B2* | 2/2010 | Smith et al. ................... 725/135 |
| 7,801,910 B2 | 9/2010 | Houh et al. |
| 7,889,964 B1 | 2/2011 | Barton et al. |
| 8,438,595 B1 | 5/2013 | Kannan |
| 2004/0255249 A1* | 12/2004 | Chang et al. ................... 715/723 |
| 2007/0300250 A1* | 12/2007 | Smith et al. ..................... 725/20 |
| 2012/0155833 A1 | 6/2012 | Narayanan et al. |

FOREIGN PATENT DOCUMENTS

WO WO 03051031 A2 * 6/2003

\* cited by examiner

*Primary Examiner* — Fernando Alcon
(74) *Attorney, Agent, or Firm* — Amin, Turocy & Watson, LLP

(57) ABSTRACT

A method and computing device for determining the location of a point of interest in a media stream. The method receives an order of duplication for a media stream and a sequence of caption data strings associated with the media stream. The method computes a hash value for a selected string in the sequence. The hash value representing the selected string, and a number of strings in the sequence that immediately precede the selected string, where the order of duplication determines the number of strings. The method receives a media stream time for the selected string based on the hash value, and determines a time at a point of interest in the media stream relative to the media stream time for the selected string.

28 Claims, 5 Drawing Sheets

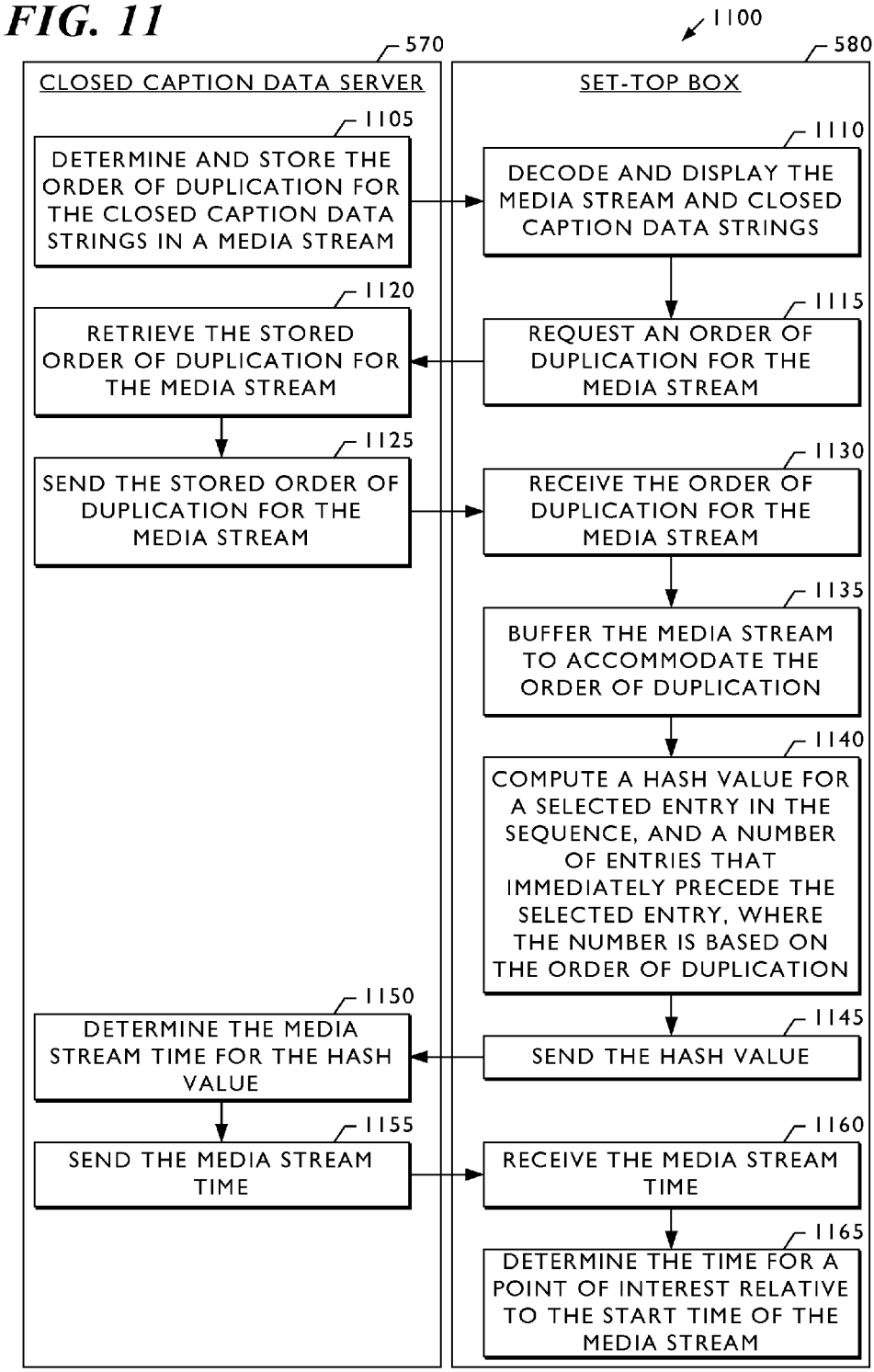

DETERMINING THE LOCATION OF A POINT OF INTEREST IN A MEDIA STREAM THAT INCLUDES CAPTION DATA

BACKGROUND

Television for long has been a known conversation starter. People love to watch television and movies and enjoy discussing at length their favorite shows. The advent of social media has given a new dimension to these conversations that were previously restricted to the dinner table or office. The recent phenomena of "tweeting" and updating status via Facebook have taken television-oriented conversations, as well as all other conversations, to a new level. Conversationalists enjoy talking about a television show or movie not only after the event, but also while watching it. This preference continues whether the conversationalists are located in same house or networked across great distances. All corporations that want to participate in this idea are coming up with new "socializing strategies" in such scenarios. One such strategy uses a dedicated server that connects group of viewers on a network and allows each viewer to update the content that the user is currently viewing on a television connected to a set-top box. Other strategies use social media products that allow each viewer to tag content via the set-top box or even comment on the content via the set-top box at various points during a live or recorded media stream.

BRIEF DESCRIPTION OF THE DRAWINGS

FIG. 11 is a flow diagram that illustrates one embodiment of a method of determining the location of a point of interest in a media stream.

DETAILED DESCRIPTION

Although some conventional solutions allow a viewer to post social media comments on the content (e.g., movie, or television show) via a computing device other than a set-top box, these solutions associate the viewer's comments with the entire content. There is a need for a system that allows the viewer to instantly post, and later read, comments or updates of the currently viewed content via social media based on a specific scene in the content. Such a system would allow the viewer to provide instant viewer comments or updates during the viewing of a live or recorded media stream.

Nevertheless, some conventional solutions do not provide the capability of determining absolute content position from the start of content while the consumer is watching it. In other words, to enable a viewer to post a comment based on a scene in the content, a system needs to be able to determine the exact location—position, and time from the start of the content—of any particular scene in the content. If a system can determine the exact location of a scene relative to the start of content, then it would be possible to capture and store the viewer's comment and then later present those scene specific social media updates and tags to their social network. In addition, if such exact location is detectable then it opens the door for introducing other opportunities such as scene-specific or comment-based targeted advertisement that are accurately targeted to a viewer based on the scene viewed and comment introduced by that viewer.

Figure 2:
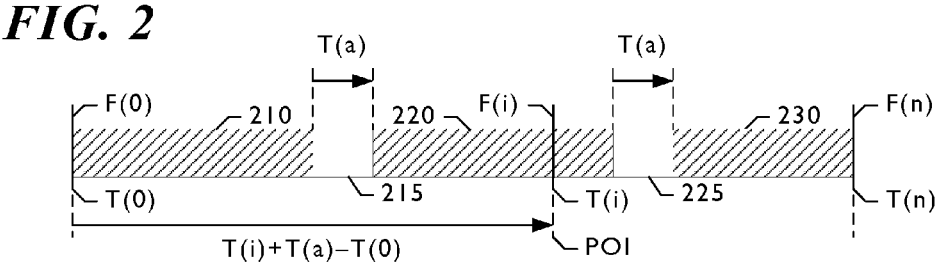
FIG. 2 is a timeline diagram that illustrates one embodiment of determining the location of a point of interest in a media stream with extraneous content played by a set-top box.
Figure 3:
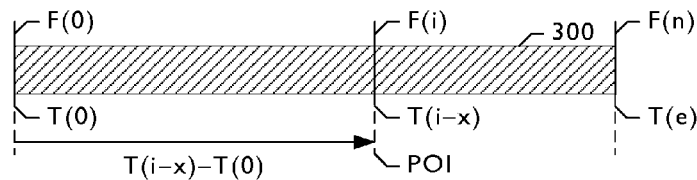
FIG. 3 is a timeline diagram that illustrates one embodiment of determining the location of a point of interest in an edited media stream played by a set-top box.
Figure 4:
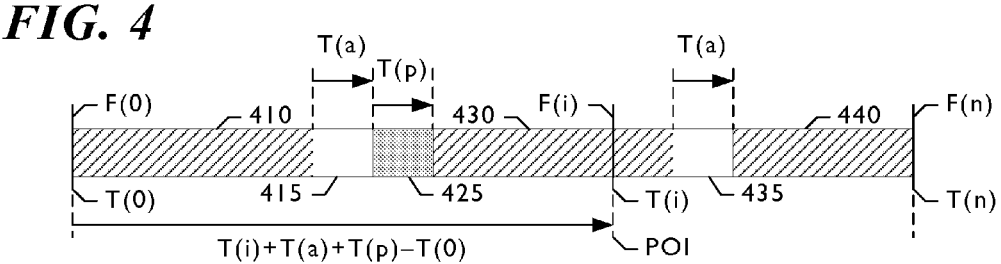
FIG. 4 is a timeline diagram that illustrates one embodiment of determining the location of a point of interest in a media stream with extraneous content played by a DVR when a viewer pauses and resumes playback of the media stream.

When a customer's set-top box is decoding a media stream, the current metadata for the media stream does not indicate at what point of the original stream it is currently playing out the content. If the set-top box tunes to the content from the start of the program, it may be possible at the set-top box to determine how far the content has played from the start. However, if the set-top box tunes to the content at some time after the start of the program, then it is impossible for the set-top box to determine how far the current point of content is from the start of the content. In other words, it is only possible to know the current position of the content with respect to the tuned point of content and not with respect to the beginning of the content. Furthermore, from a service operator's point of view, it would be of great interest to know the current point of the content that is playing at the customer's set-top box, assuming the customer tunes and plays-out, or requests to perform a trick play of the content, during the playing of the content. FIG. 2, FIG. 3, and FIG. 4, described below, depict embodiments of this scenario and illustrate examples of why the time elapsed from the start of the content is not always useful for determining the location of a point of interest.

Figure 1:
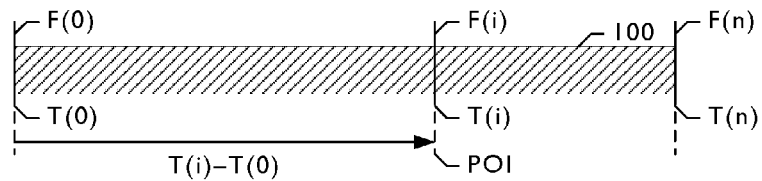
FIG. 1 is a timeline diagram that illustrates one embodiment of determining the location of a point of interest in a media stream played by a set-top box.

FIG. 1 is a timeline diagram that illustrates one embodiment of determining the location of a point of interest in a media stream played by a set-top box. The media stream 100 shown in FIG. 1 is the original content, unedited and without any extraneous content. The set-top box begins playing the media stream 100 by decoding and displaying frame F(0) at time T(0). The set-top box continues decoding and displaying the frames in sequence until it decodes and displays frame F(i) at time T(i). If frame F(i) is a point of interest (POI), the set-top box can determine the location of the POI by calculating the time elapsed since the start of the program, that is, T(i)–T(0). The timeline shown in FIG. 1 illustrates the most simplistic scenario of determining the location of the POI during the playback of an unedited and uninterrupted media stream. FIG. 2, FIG. 3, and FIG. 4 illustrate embodiments of more complex scenarios.

Extraneous content is any type of content that is not part of the original, unadulterated media. The term "extraneous content" includes content such as advertisements, commentary on the original content, and the like. The presence of extraneous content will lengthen the original content and push a POI after the extraneous content farther away from the start of program. Thus, a POI after the extraneous content now appears at a time that is lengthened by the length of the extraneous content. In addition, the length and manner that extraneous content is added to an original content may vary from one service provider to another.

FIG. 2 is a timeline diagram that illustrates one embodiment of determining the location of a point of interest in a media stream with extraneous content played by a set-top box. The media stream shown in FIG. 2 is the original content with extraneous content (e.g., advertisements) inserted between the media stream segments. The set-top box begins playing a first segment of the media stream 210 by decoding and displaying frame F(0) at time T(0). At the end of the first segment 210, the set-top box decodes and displays a first advertisement 215 that runs for a time T(a). At the end of the first advertisement 215, the set-top box decodes and displays the second segment 220 until it decodes and displays frame F(i) at time T(i). If frame F(i) is a POI, the set-top box can determine the location of the POI by calculating the time elapsed since the start of the program, that is, T(i)+T(a)−T(0).

If the content streamed by a multi-service operator (MSO) did not have any extraneous content, such as advertisements, introduced in the original content then it would be possible to approximate the time of content by taking the difference between current time and the program start time included in the electronic program guide. However, the MSO may edit the original content before broadcast. In one embodiment, the MSO may edit the original content because of ratings consideration of a region. In such cases, a simple difference between current time and clock-based program start time is not sufficient to determine the absolute position of the content.

FIG. 3 is a timeline diagram that illustrates one embodiment of determining the location of a point of interest in an edited media stream played by a set-top box. The media stream 300 shown in FIG. 3 is the original content edited before streaming. The set-top box begins playing the edited media stream 300 by decoding and displaying frame F(0) at time T(0). The set-top box continues decoding and displaying the frames in sequence until it decodes and displays frame F(i) at time T(i−x), where T(x) is the duration of the content that the editor removed from the original stream. If frame F(i) is a POI, the set-top box can determine the location of the POI by calculating the time elapsed since the start of the program, that is, T(i−x)−T(0). Since the media stream 300 has been edited by the MSO, frame F(i) may still be displayed, but it is displayed at a time before the original frame F(i), where the difference in time is determined by the length of the frames deleted by the MSO.

The identification of an absolute content position becomes even more challenging when the play-out of the content is from a local digital video recorder (DVR) with no program start time. In addition, when the customer requests a trick play during the play-out of the content, it becomes impossible to predict the current content position based on program start time available in the program guide.

FIG. 4 is a timeline diagram that illustrates one embodiment of determining the location of a point of interest in a media stream with extraneous content played by a DVR when a viewer pauses and resumes playback of the media stream. The media stream shown in FIG. 4 is the original content with extraneous content (e.g., advertisements) inserted between the media stream segments. The DVR begins playing a first segment of the media stream 410 by decoding and displaying frame F(0) at time T(0). At the end of the first segment 410, the DVR decodes and displays a first advertisement 415 that runs for a time T(a). At the end of the first advertisement 415, the viewer pauses the playback for a time T(p). When the viewer resume the playback, the DVR decodes and displays the second segment 420 until it decodes and displays frame F(i) at time T(i). If frame F(i) is a POI, the DVR can determine the location of the POI by calculating the time elapsed since the start of the program, that is, T(i)+T(a)+T(p)−T(0).

Currently, set-top boxes and media players on devices such as mobile phones, tablets, notebooks, and desktop computers cannot detect unambiguously and uniquely the exact position of the playback of content. This problem is further exacerbated when the media stream is edited before delivery or includes extraneous content. The content may be streamed from any source such as a live media stream delivered on terrestrial, cable, or satellite, delivered via the Internet as IP packets, or delivered from a local media storage device such as a DVR. Moreover, there is no guarantee that the media stream played is an exact replica of the original content. Consequently, it is difficult to detect the exact content location based on metadata alone or simple observation points such as time since start of play.

Captioning is the process of converting the audio content of a television broadcast, webcast, film, video, CD-ROM, DVD, live event, or other productions into caption data and displaying the text component of the caption data on a screen, monitor, or other visual display system. Captions not only display words as the textual equivalent of spoken dialogue or narration, but also include speaker identification, sound effects, and music description. Closed captions (i.e., closed caption data) are captions that are encoded, or embedded, into the video and cannot be seen unless turned on using your television or set-top box menu. Open captions (i.e., open caption data) are always visible and cannot be turned off because they are burned directly into the video and are a part of the picture. Subtitling is the process of making the soundtrack of a video recognizable to viewers who do not understand the language of the spoken dialogue or viewers unable to hear the audio. Subtitles (i.e., subtitle data) may appear as translations to foreign languages from the spoken language or straight transcripts of the spoken language. Generally, captions are not distinguishable from subtitles. However, in the United States and Canada, the aim of subtitles is to describe to a viewer who can hear but cannot understand the language or accent of the dialogue and some on-screen text, whereas the aim of captions is to describe to the deaf and hard of hearing all significant spoken dialogue, non-speech information, music, or sound effects. The Electronic Industries Alliance EIA-608 standard describes the encoding of closed captions, also known as line 21 captions, for National Television System Committee (NTSC) analog television broadcasts in the United States and Canada. The Electronic Industries Alliance CEA-708 standard describes the encoding of closed captions for Advanced Television Systems Committee (ATSC) digital television broadcasts in the United States and Canada. Accordingly, the use herein of the terms "caption", "captioning", "subtitle", and "subtitling" are synonymous, at least in some respects, and are not limiting to the teachings herein.

Some conventional solutions use closed caption tags that include commands and control information that the set-top box processes. Other conventional solutions use enhanced metadata in a searchable index to identify content segments and corresponding timing information. All of these conventional solutions add data to the media stream and require the MSO to install additional hardware and software, or do not accommodate media streams that are edited by the MSO or include extraneous content.

Figure 5:
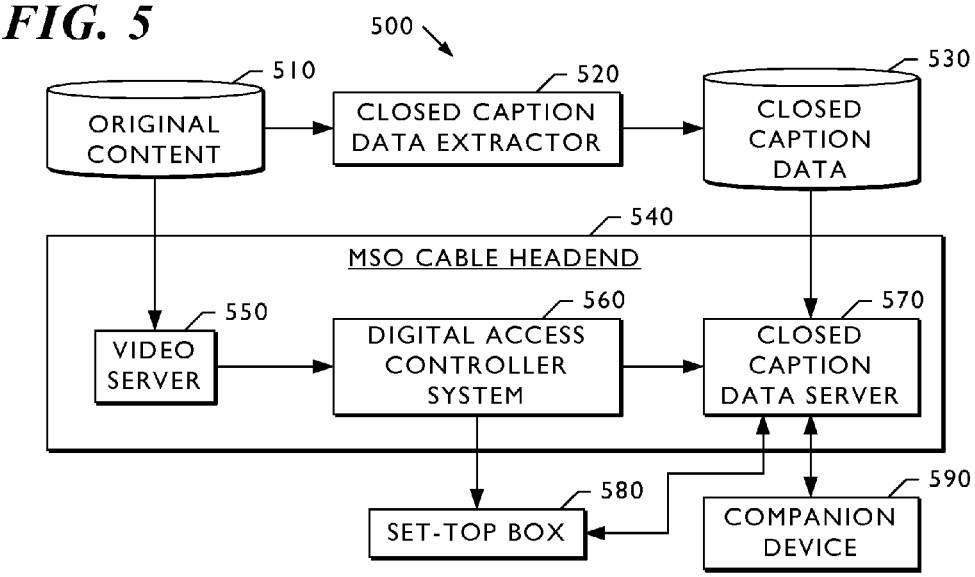
FIG. 5 is a block diagram that illustrates one embodiment of the hardware components of a system that determines the location of a point of interest in a media stream.

FIG. 5 is a block diagram that illustrates one embodiment of the hardware components of a system that determines the location of a point of interest in a media stream. The closed caption data extractor 520 extracts closed caption data from the original content 510 to generate closed caption data 530. In another embodiment, the closed caption data extractor 520 extracts caption data, in general, from the original content 510 to generate a caption data file. The closed caption data extractor 520 uploads the closed caption data 530 to the closed caption data server 570. In one embodiment, the closed caption data extractor 520 generates the closed caption data 530 as a file that contains all the captioning data for the original content 510 and that is stored separately in an interchangeable file format. In various embodiments, the closed caption data 530 file is in a file format such as SubViewer (*.SUB), SubRip (*.SRT), Scenarist Closed Caption (*.SCC), or a comparable file format that contains all the captioning data for the original content 510. If the closed caption data 530 file is not available, it may be easily generated offline using the closed caption data extractor 520.

The MSO cable headend 540 includes a video server 550, digital access controller (DAC) system 560, and closed caption data server 570. The video server 550 is a general-purpose server computer that receives the original content 510, and serves the original content 510 to a client device, such as a set-top box 580, at a customer location via the DAC system 560. The closed caption data server 570 is general-purpose server computer that receives and stores the closed caption data 530, and receives set-top box 580 user information and the paired companion device 590 information via the digital access controller system 560. As described above, the closed caption data 530 is input to the closed caption data server 570 as a file that contains all the captioning data for the original content 510 and that is stored separately in an interchangeable file format. The closed caption data server 570 includes programming to receive and store the closed caption data 530, and calculate and store the order of duplication data and hash values for the closed caption data 530 in a hash table.

The set-top box 580 shown in FIG. 5 is a client device that communicates with the closed caption data server 570 to obtain the previously determined order of duplication (OD) value, and in return constantly updates the content position related information (or hash codes as described herein) to the closed caption data server 570 regarding the original content 510 played at the set-top box 580. The companion device 590 shown in FIG. 5 is a client device, such as a mobile telephone, tablet, personal computer, or another set-top box, that is processing or consuming the media stream time.

Figure 6:
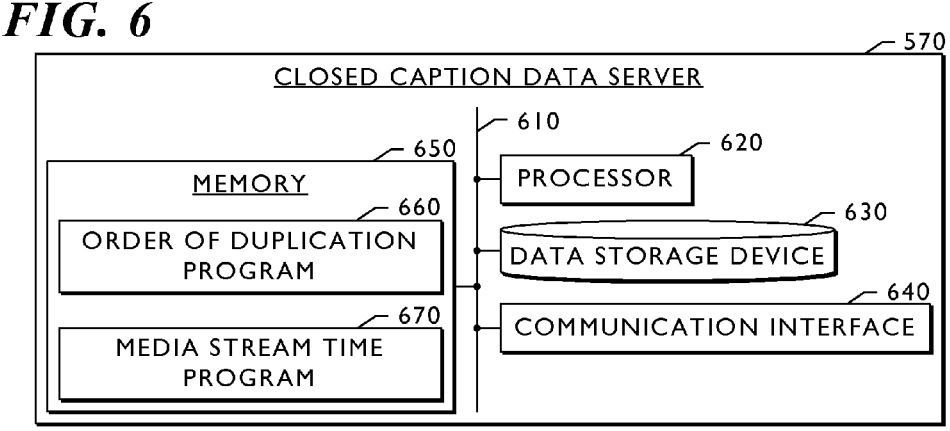
FIG. 6 is a block diagram that illustrates, in detail, one embodiment of the hardware components shown in FIG. 5.

FIG. 6 is a block diagram that illustrates, in detail, one embodiment of the hardware components shown in FIG. 5. As shown in FIG. 6, the closed caption data server 570 is a general-purpose server computer. A bus 610 is a communication medium connecting a processor 620, data storage device 630 (such as a serial ATA (SATA) hard disk drive, optical drive, small computer system interface (SCSI) disk, flash memory, or the like), communication interface 640, and memory 650 (such as random access memory (RAM), dynamic RAM (DRAM), non-volatile computer memory, flash memory, or the like). The communication interface 640 connects the closed caption data server 570 to the cable network (not shown) and allows for two-way communication of data and content.

The processor 620 of the closed caption data server 570 performs the disclosed methods by executing sequences of operational instructions that comprise each computer program resident in, or operative on, the memory 650. The reader should understand that the memory 650 may include operating system, administrative, and database programs that support the programs disclosed in this application. In one embodiment, the configuration of the memory 650 of the closed caption data server 570 includes an order of duplication program 660, and media stream time program 670. The order of duplication program 660 and media stream time program 670 performs the method disclosed in the exemplary embodiments depicted in FIGS. 8, 9, 10, and 11. When the processor 620 performs the disclosed method, it stores intermediate results in the memory 650 or data storage device 630. In another embodiment, the processor 620 may swap these programs, or portions thereof, in and out of the memory 650 as needed, and thus may include fewer than all of these programs at any one time.

Figure 7:
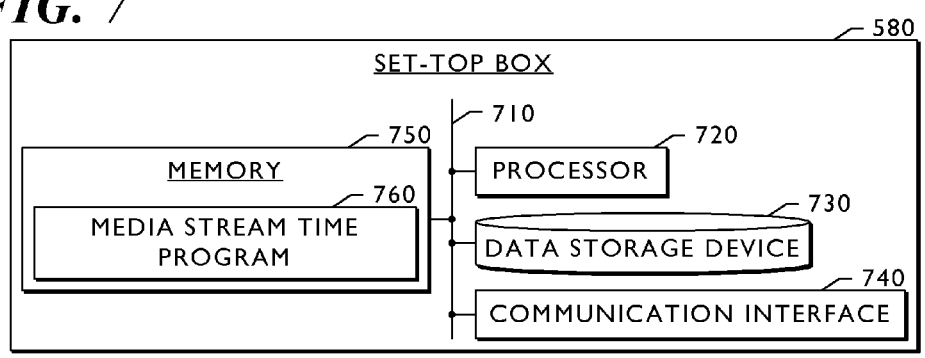
FIG. 7 is a block diagram that illustrates, in detail, one embodiment of the hardware components shown in FIG. 5.

FIG. 7 is a block diagram that illustrates, in detail, one embodiment of the hardware components shown in FIG. 5. As shown in FIG. 7, the set-top box 580 is a general-purpose computer. In another embodiment, the set-top box 580 shown in FIG. 7 is a companion device 590. A bus 710 is a communication medium connecting a processor 720, data storage device 730 (such as a serial ATA (SATA) hard disk drive, optical drive, small computer system interface (SCSI) disk, flash memory, or the like), communication interface 740, and memory 750 (such as random access memory (RAM), dynamic RAM (DRAM), non-volatile computer memory, flash memory, or the like). The communication interface 740 connects the set-top box 580 to the cable network (not shown) and allows for two-way communication of data and content.

The processor 720 of the set-top box 580 performs the disclosed methods by executing sequences of operational instructions that comprise each computer program resident in, or operative on, the memory 750. The reader should understand that the memory 750 may include operating system, administrative, and database programs that support the programs disclosed in this application. In one embodiment, the configuration of the memory 750 of the set-top box 580 includes a media stream time program 760. The media stream time program 670 performs the method disclosed in the exemplary embodiments depicted in FIGS. 8, 9, 10, and 11. When the processor 720 performs the disclosed method, it stores intermediate results in the memory 750 or data storage device 730. In another embodiment, the processor 720 may swap these programs, or portions thereof, in and out of the memory 750 as needed, and thus may include fewer than all of these programs at any one time.

In one embodiment, the closed caption data server 570 receives and stores the closed caption data 530, and determines the order of duplication of the original content 510. When one or more caption data strings repeat in a media stream, the order of duplication (OD) is defined as the number of caption data strings that appear before the current caption data string that need to be included to uniquely identify the current caption data string. The order of duplication is any positive non-zero integer value. For example, consider a media stream that includes two appearances of the caption data string "X". If the caption data string "A" immediately precedes the first appearance of "X" and the caption data string "B" immediately precedes the second appearance of "X", then the order of duplication is 2. However, if the caption data string "A" immediately precedes both appearances of the data string "X", and the caption data string "C" immediately precedes the first appearance of "A" followed immediately by "X", and the caption data string "D" immediately precedes the second appearance of "A" followed by "X", then the order of duplication is 3.

Figure 8:
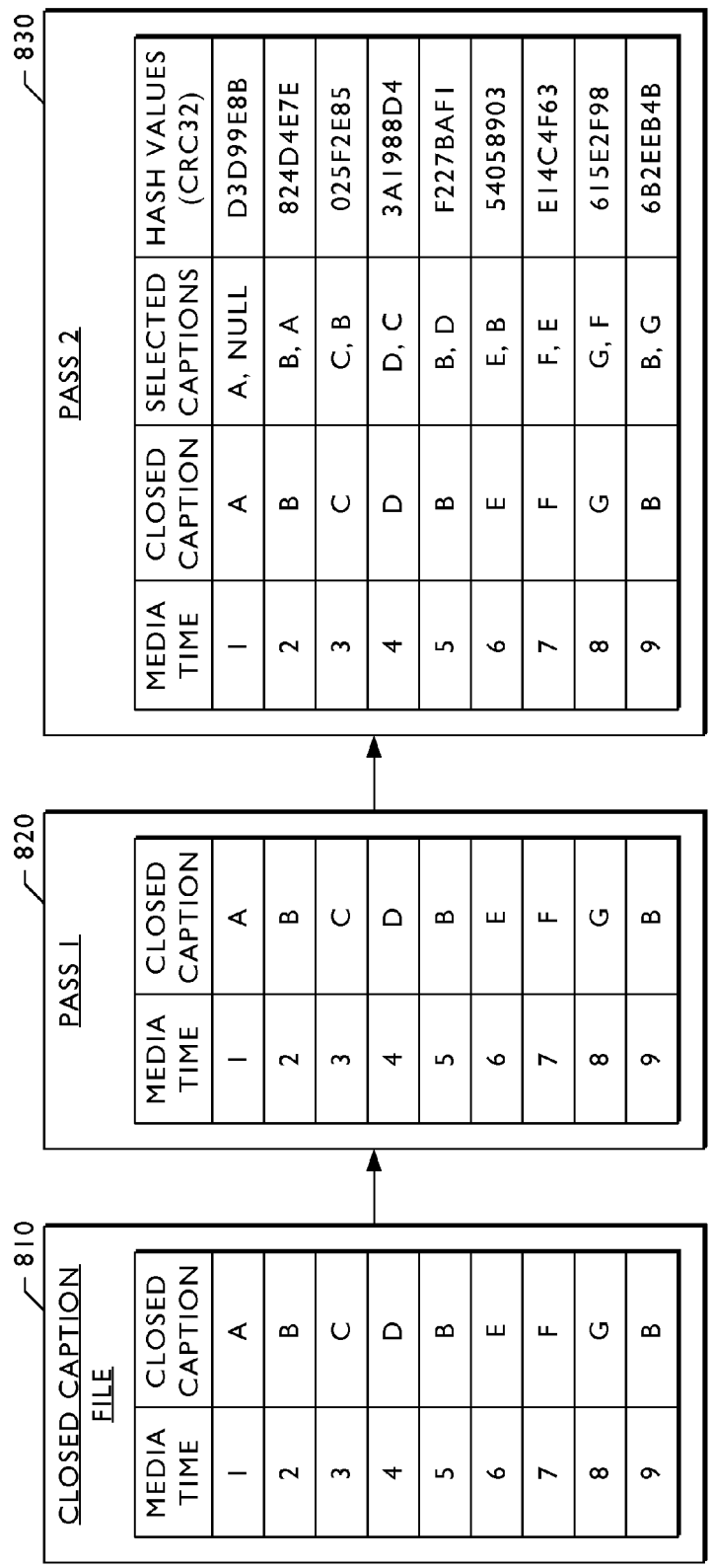
FIG. 8 is a tabular diagram that illustrates one embodiment of a method for uniquely identifying the current location in a media stream.

FIG. 8 is a tabular diagram that illustrates one embodiment of a method for uniquely identifying the current location in a media stream. The embodiment shown in FIG. 8 illustrates a two-pass approach. The closed caption file 810 includes a sequence of closed caption data strings in a media stream. At media time 1, the caption data string is "A". At media time 2, the caption data string is "B". At media time 3, the caption data string is "C". At media time 4, the caption data string is "D". At media time 5, the caption data string is "B". At media time 6, the caption data string is "E". At media time 7, the caption data string is "F". At media time 8, the caption data string is "G". At media time 9, the caption data string is "B". During pass 1 820, the closed caption data server 570 determines the order of duplication of the content. Pass 1 820 determines that the caption data string "B" appears in the closed caption file 810 three time (media time 2, media time 5, and media time 9). Since the caption data string that immediately precedes each appearance of the caption data string "B" is different ("A" at media time 1, "D" at media time 4, and "G" at media time 8), pass 1 820 determines that the order of duplication is 2. During pass 2 830, the closed caption data server 570 generates an unambiguous and unique hash value for each entry in the caption data signifying the different locations of content. Since the order of duplication is 2, the closed caption data server 570 appends the immediately preceding caption data string to the current caption data string and generates a hash code for the appended combination. As shown in FIG. 8, pass 2 830 generates a hash code of "D3D99E8B" at media time 1 for the combination of closed caption data string "A" and "null", a hash code of "824D4E7E" at media time 2 for the combination of closed caption data string "B" and "A", etc. The hash values generated during pass 2 830 are the hash table for the media stream. The time location corresponding to each unambiguous and unique hash value determines the media stream time of the content location. The media stream time is the relative time that a point of interest (POI) occurs in a media stream with respect to the start of the content. This media stream time is based on the caption data associated with the point of interest. This media stream time, as defined herein, differs from another media stream time, such as the presentation time stamp, which may be derived based on the frame position in the content. In one embodiment, the closed caption data server 570 expresses the media stream in the time units of seconds.

If the closed caption file 810 does not include any repeated caption data strings, then the order of duplication is 1, and the closed caption data server 570 uses only the current caption data string to generate a hash value. If the closed caption file 810 includes repeated caption data strings, then the order of duplication is greater than 1, and the closed caption data server 570 uses the current caption data string (n) and one less than the order of duplication (OD−1) immediately preceding caption data strings to generate a hash value. The only exception when the order of duplication is greater than 1 is for dealing with the first caption data string of the content. Since there are no immediately preceding caption data strings, the closed caption data server 570 uses the "null" string to generate the hash value. In one embodiment, the closed caption data server 570 only performs this two-pass method (as for this example, however typically a multi-pass method) once during the lifetime of the media stream stored in the closed caption data server 570.

The hash values generated for each entry in the closed caption file 810 are useful when comparing the incoming hash value from the client devices in order to unambiguously and uniquely identify the current location of the media stream. When a client device reports a hash value then the closed caption data server 570 would search the database for the hash value and determine the media stream time for the corresponding location of the content. The closed caption data server 570 can then publish this media stream time to a companion device for other purposes such as targeted advertising to the original user viewing the content on the set-top box 580 or companion device 590 for identifying comments (i.e., tags) position to use in social networking with other users.

Figure 9:
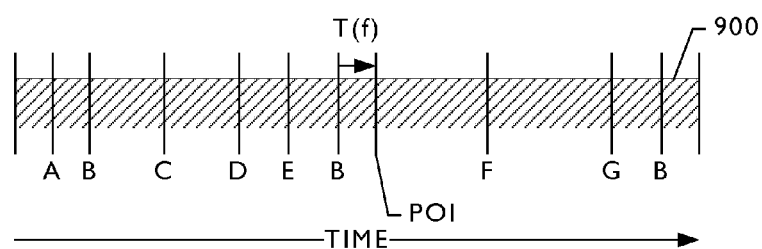
FIG. 9 is a timeline diagram that illustrates one embodiment of the location of a point of interest in a media stream of caption data strings.

FIG. 9 is a timeline diagram that illustrates one embodiment of the location of a point of interest in a media stream of caption data strings. The media stream 900 shown in FIG. 9 is the original content, unedited and without any extraneous content. A set-top box 580 begins playing the media stream 900 by decoding and displaying each sequential video frame in a time sequence of video frames. The set-top box 580 also decodes the caption data in the video frames to display it on the screen. As shown in FIG. 9, the set top box 580 encounters the caption data strings "A", "B", "C", "D", "E", and "B" before reaching the POI at a time T(f) after the second appearance of the caption data string "B". The set-top box 580 can determine the position of the POI by calculating the time elapsed since the start of the program. This is a case when there is no extraneous content introduced, no editing done to the content and no trick play operation performed during the content play back. Also, since caption data "B" is repeating in this case, one cannot unambiguously determine the POI for this scenario.

Figure 10:
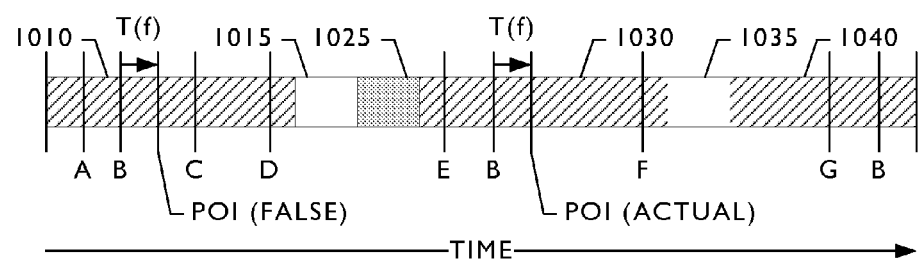
FIG. 10 is a timeline diagram that illustrates one embodiment of the location of a point of interest in a media stream of caption data strings with extraneous content played by a DVR when a viewer pauses and resumes playback of the media stream.

FIG. 10 is a timeline diagram that illustrates one embodiment of the location of a point of interest in a media stream of caption data strings with extraneous content played by a DVR when a viewer pauses and resumes playback of the media stream. The media stream shown in FIG. 10 is the original content shown in FIG. 9 with extraneous content (e.g., advertisements) inserted between the media stream segments. The DVR begins playing a first segment of the media stream 1010 by decoding and displaying each sequential video frame in a time sequence of video frames. At the end of the first segment 1010, the DVR decodes and displays a first advertisement 1015. At the end of the first advertisement 1015, the viewer requests to pause the playback for a time 1025. When the viewer resumes the playback, the DVR decodes and displays the second segment 1020 until it reaches the POI (actual). As shown in FIG. 10, the set-top box 580 encounters the caption data strings "A", "B", "C", and "D" embedded in the media stream before reaching the first advertisement 1015 and the viewer pause 1025. The set-top box 580 encounters the caption data string "E" and "B" before reaching the POI (actual) at a time T(f) after the second appearance of the caption data string "B". If the set-top box 580 is determining the position of the POI (actual), it may incorrectly determine the location as POI (false) because the caption data string "B" is repeated in the media stream. The set-top box 580 uses the previously received order of duplication (2) from the closed caption data server 570 to keep calculating and sending the hash values of the content being played back to the closed caption data server 570. The closed caption data server 570 then uses the received hash value for each set-top box 580 to uniquely identify the POI (actual) as the correct location of the media stream time for that particular set-top box 580. The closed caption data server 570 detects, calculates, stores, and repeatedly publishes the media stream time of the content played at the set-top box 580 at the customer premises down to the frame and scene level. Thus, a system that registers with the closed caption data server 570 to receive the media stream time can utilize the media stream time to interface with a social networking system, or targeted advertisement system.

FIG. 11 is a flow diagram that illustrates one embodiment of a method of determining the location of a point of interest in a media stream. The process 1100 shown in FIG. 11 begins when the closed caption data server 570 determines and stores the order of duplication for the caption data strings in the media stream (step 1105). The set-top box 580 decodes and displays the media stream and caption data strings (step 1110). In one embodiment, the set-top box 580 tunes to a channel, receives the media stream as a sequence of frames from the DAC system 560, and decodes the caption data strings in the media stream for display on a display device. The set-top box 580 sends a request to the closed caption data server 570 for an order of duplication for the media stream (step 1115). The closed caption data server 570 receives the request and retrieves the stored order of duplication for the media stream (step 1120). The closed caption data server 570 sends the stored order of duplication for the caption data strings to the set-top box 580 (step 1125). In one embodiment, the caption data strings are in a caption file, and the order of duplication is associated with the caption file. In another embodiment, the closed caption data server 570 extracts the caption data strings and calculates the order of duplication for the caption data strings before the content is broadcast to the set-top box 580 and all other concerned devices. The set-top box 580 receives the order of duplication for the media stream (step 1130), and begins buffering the media stream and the sequence of caption data strings to accommodate the order of duplication (step 1135). In one embodiment, the set-top box 580 uses the order of duplication to determine a buffer size that is sufficient for storing decoded caption data in the media stream. In another embodiment, the set-top box 580 either identifies, or receives a notification, of the presence of advertisements in the media stream, and ignores the caption data played-out in the advertisement. To determine a location of a point of interest in the media stream, the set-top box 580 computes a hash value for a selected entry in the sequence of caption data strings, and a number of entries immediately preceding the selected entry, where the number of entries is based on the order of duplication (step 1140). In one embodiment, the number of immediately preceding entries used to compute the hash value is one less than the order of duplication. The set-top box 580 sends the hash value to the closed caption data server 570 (step 1145). The closed caption data server 570 determines the media stream time for the hash value (step 1150), and sends the media stream time to the set-top box 580 (step 1155). In one embodiment, the closed caption data server 570 sends the media stream time to any device registered as a concerned device with the closed caption data server 570. As shown in FIG. 11, the set-top box 580 is a concerned device. In another embodiment to that shown in FIG. 11, the companion device 590 is a concerned device. In one embodiment, registration of a concerned device is recognition by the closed caption data server 570 of the presence of the concerned device on the network that connects to the closed caption data server 570. As shown in FIG. 11, the set-top box 580 receives the media stream time (step 1160), and uses the media stream time to determine the time for the point of interest relative to the start time of the media stream (step 1165). In one embodiment, the set-top box 580 is aware of the time between the selected entry and the point of interest, and adds this time to the media stream time for the selected entry to determine the time for the point of interest.

In one embodiment, the system illustrated in FIG. 5 includes two components. The first component operates in a server computer such as the closed caption data server 570. The first component computes the order of duplication and hash table values for caption data associated with a media stream. The second component operates in customer premises equipment such as the set-top box 580. The second component receives an order of duplication for a media stream from the first component and computes a hash value for a point of interest in the media stream using the order of duplication and live caption data received by the set-top box 580. The second component sends the computed hash value to the first component. The first component compares the computed hash value to the hash table values to obtain a media stream time for the point of interest, and returns the media stream time to the second component.

Although the disclosed embodiments describe a fully functioning method and computing device for determining the location of a point of interest in a media stream, the reader should understand that other equivalent embodiments exist. Since numerous modifications and variations will occur to those reviewing this disclosure, the method and computing device for determining the location of a point of interest in a media stream is not limited to the exact construction and operation illustrated and disclosed. Accordingly, this disclosure intends all suitable modifications and equivalents to fall within the scope of the claims.

We claim:

1. A method, comprising:
    a set-top box (STB) receiving an order of duplication for a media stream, the order of duplication relating to a sequence of caption data strings associated with the media stream;
    the STB computing a hash value for a selected string in the sequence, the hash value representing the selected string, and a number of strings in the sequence that immediately precede the selected string, where the order of duplication determines the number of strings;
    the STB receiving a media stream time for the selected string based on the hash value; and
    the STB determining a time at a point of interest in the media stream relative to the media stream time for the selected string.

2. The method of claim 1, wherein the receiving of the order of duplication further comprises:
    tuning to a channel;
    receiving the media stream for the channel;
    requesting the order of duplication;
    decoding the sequence of caption data strings associated with the media stream; and
    displaying the media stream and the sequence of caption data strings associated with the media stream.

3. The method of claim 1, wherein the number of strings for the order of duplication uniquely identify a repeated string in the sequence.

4. The method of claim 3, wherein the number of strings immediately precede the repeated string.

5. The method of claim 1, wherein the computing of the hash value further comprises:
    creating a hash string by concatenating the selected string and the number of strings in the sequence that immediately precede the selected string; and
    computing the hash value of the hash string.

6. The method of claim 1, wherein the receiving of the media stream time further comprises:
    sending the hash value for the selected string.

7. The method of claim 1, wherein the determining of the time at the point of interest further comprises:
    determining an elapsed time from the selected string to the point of interest; and
    computing the time at the point of interest by adding the elapsed time to the media stream time for the selected string, wherein appearance of the selected string in the media stream precedes appearance of the point of interest in the media stream.

8. The method of claim 1, wherein the point of interest is a frame of the media stream.

9. The method of claim 1, wherein the caption data is selected from a group consisting of closed caption data, open caption data, and subtitle data.

10. A computing device, comprising:
a communication interface that receives a media stream, and a sequence of caption data strings associated with the media stream;
a memory device resident in the computing device; and
a processor disposed in communication with the communication interface and the memory device, the processor configured to:
receive an order of duplication for the media stream, the order of duplication relating to the sequence of caption data strings associated with the media stream;
compute a hash value for a selected string in the sequence, the hash value representing the selected string, and a number of strings in the sequence that immediately precede the selected string, where the order of duplication determines the number of strings;
receive a media stream time for the selected string based on the hash value; and
determine a time at a point of interest in the media stream relative to the media stream time for the selected string.

11. The computing device of claim 10, wherein to receive the order of duplication, the processor is further configured to:
tune to a channel;
receive the media stream for the channel;
request the order of duplication;
decode the sequence of caption data strings associated with the media stream; and
display the media stream and the sequence of caption data strings associated with the media stream.

12. The computing device of claim 10, wherein the number of strings for the order of duplication uniquely identify a repeated string in the sequence.

13. The computing device of claim 12, wherein the number of strings immediately precede the repeated string.

14. The computing device of claim 10, wherein to compute the hash value, the processor is further configured to:
create a hash string by concatenating the selected string and the number of strings in the sequence that immediately precede the selected string; and
compute the hash value of the hash string.

15. The computing device of claim 10, wherein to receive the media stream time, the processor is further configured to:
send the hash value for the selected string.

16. The computing device of claim 10, wherein to determine the time at the point of interest, the processor is further configured to:
determine an elapsed time from the selected string to the point of interest; and
compute the time at the point of interest by adding the elapsed time to the media stream time for the selected string,
wherein appearance of the selected string in the media stream precedes appearance of the point of interest in the media stream.

17. The computing device of claim 10, wherein the point of interest is a frame of the media stream.

18. The computing device of claim 10, wherein the caption data is selected from a group consisting of closed caption data, open caption data, and subtitle data.

19. A method, comprising:
a server determining an order of duplication for a media stream, the order of duplication relating to a sequence of caption data strings associated with the media stream;
the server sending the order of duplication for the media stream; receiving a hash value for a selected string in the sequence, the hash value representing the selected string, and a number of strings in the sequence that immediately precede the selected string, where the order of duplication determines the number of strings;
the server determining a media stream time for the selected string based on the hash value; and
the server sending the media stream time for the selected string.

20. The method of claim 19, wherein the determining of the order of duplication for the media stream further comprises:
identifying a repeated string in the sequence;
determining the order of duplication for the sequence based on the repeated string, and the number of strings immediately preceding the repeated string that uniquely identify the repeated string;
computing the hash value for each string in the sequence to create a hash table for the sequence, where the computation of each hash value is based on the order of duplication;
storing the hash table for the sequence; and
storing the order of duplication for the media stream.

21. The method of claim 20, wherein the determining of the media stream time further comprises:
locating a matching string in the hash table for the hash value for the selected string in the sequence, wherein the time associated with the matching string is the media stream time.

22. The method of claim 19, wherein the sending of the order of duplication for the media stream further comprises:
receiving a request for the order of duplication for the media stream; and
sending the order of duplication for the media stream in a response to the request.

23. The method of claim 19, wherein the caption data is selected from a group consisting of closed caption data, open caption data, and subtitle data.

24. A computing device, comprising:
a communication interface that receives a media stream, and a sequence of caption data strings associated with the media stream;
a memory device resident in the computing device; and
a processor disposed in communication with the communication interface and the memory device, the processor configured to:
determine an order of duplication for the media stream, the order of duplication relating to the sequence of caption data strings associated with the media stream;
send the order of duplication for the media stream;
receive a hash value for a selected string in the sequence, the hash value representing the selected string, and a number of strings in the sequence that immediately precede the selected string, where the order of duplication determines the number of strings;
determine a media stream time for the selected string based on the hash value; and
send the media stream time for the selected string.

25. The computing device of claim 24, wherein to determine the order of duplication for the media stream, the processor is further configured to:
- identify a repeated string in the sequence;
- determine the order of duplication for the sequence based on the repeated string, and the number of strings immediately preceding the repeated string that uniquely identify the repeated string;
- compute the hash value for each string in the sequence to create a hash table for the sequence, where the computation of each hash value is based on the order of duplication;
- store the hash table for the sequence; and
- store the order of duplication for the media stream.

26. The computing device of claim 25, wherein to determine the media stream time, the processor is further configured to:
- locate a matching string in the hash table for the hash value for the selected string in the sequence, wherein the time associated with the matching string is the media stream time.

27. The computing device of claim 24, wherein to send the order of duplication for the media stream, the processor is further configured to:
- receive a request for the order of duplication for the media stream; and
- send the order of duplication for the media stream in a response to the request.

28. The computing device of claim 24, wherein the caption data is selected from a group consisting of closed caption data, open caption data, and subtitle data.

* * * * *